United States Patent
Gross

(10) Patent No.: US 12,554,867 B2
(45) Date of Patent: Feb. 17, 2026

(54) SYSTEMS AND METHODS FOR DIGITALLY CONNECTING PATIENTS TO DE-IDENTIFIED RESEARCH SPECIMENS AND DATA USING COMPOSABLE PROTOCOLS AND TOKENIZED IDENTIFIERS

(71) Applicant: de-bi, co., Baltimore, MD (US)

(72) Inventor: Marielle Gross, Baltimore, MD (US)

(73) Assignee: DE-BI, CO., Baltimore, MD (US)

( * ) Notice: Subject to any disclaimer, the term of this patent is extended or adjusted under 35 U.S.C. 154(b) by 0 days.

(21) Appl. No.: 19/220,825

(22) Filed: May 28, 2025

(65) Prior Publication Data
US 2025/0371173 A1    Dec. 4, 2025

Related U.S. Application Data

(60) Provisional application No. 63/652,640, filed on May 28, 2024.

(51) Int. Cl.
*G06F 21/60*    (2013.01)
*G16H 50/70*    (2018.01)

(52) U.S. Cl.
CPC ........... *G06F 21/602* (2013.01); *G16H 50/70* (2018.01)

(58) Field of Classification Search
CPC .............................. G06F 21/602; G16H 50/70
See application file for complete search history.

(56) References Cited

U.S. PATENT DOCUMENTS

2021/0166807 A1* 6/2021 Quennesson ........... G06F 40/30
2021/0398626 A1   12/2021 Blum et al.

(Continued)

FOREIGN PATENT DOCUMENTS

WO    2023043807 A1    3/2023

OTHER PUBLICATIONS

CloudLIMS. CloudLIMS Partners with AminoChain to Allow Biosample Donors to Follow the Journey of Their Donated Bio-material [published Jun. 26, 2023] [retrieved on Jul. 20, 2025] Retrieved from the Internet< URL: https://cloudlims.com/empowering-biosampledonors-with-biorepository-management-system-cloudlims-partners-with-aminochain/>.

(Continued)

*Primary Examiner* — Sangseok Park
(74) *Attorney, Agent, or Firm* — Outlier Patent Attorneys, PLLC

(57) ABSTRACT

A digital honest broker system and method for managing patient specimens and data that links patients to their de-identified specimens and data across multiple studies and institutions is disclosed. The platform allows patients to access and engage with their data anytime after consenting, transforming informed consent into a dynamic, long-term membership. The system integrates with existing research protocols and infrastructure without requiring substantial changes. It enables scientists to find additional specimens from their patients and collaborate with other researchers studying the same individuals. Physicians can also locate their patients' specimens and fuse relevant research data from multiple siloed settings. By empowering patients and enabling data aggregation across institutions, the digital honest broker system increases trust, participation, and accelerates scientific discoveries in biomedical research.

20 Claims, 7 Drawing Sheets

(56) References Cited

U.S. PATENT DOCUMENTS

2024/0134957 A1    4/2024    Lin
2024/0430091 A1*  12/2024  Barnes ................... G16H 10/60
2025/0021682 A1*  1/2025   Ricotta, Jr. ......... G06F 16/2379

OTHER PUBLICATIONS

International Search Report and Written Opinion by ISA/US of PCT/US25/31199 dated Jul. 29, 2025.

\* cited by examiner

SYSTEMS AND METHODS FOR DIGITALLY CONNECTING PATIENTS TO DE-IDENTIFIED RESEARCH SPECIMENS AND DATA USING COMPOSABLE PROTOCOLS AND TOKENIZED IDENTIFIERS

CROSS-REFERENCE TO RELATED APPLICATIONS

This application claims the benefit of, and priority to, U.S. Provisional Patent Application No. 63/652,640 titled "SYSTEMS AND METHODS FOR DIGITALLY CONNECTING PATIENTS TO DE-IDENTIFIED RESEARCH SPECIMENS AND DATA USING COMPOSABLE PROTOCOLS AND TOKENIZED IDENTIFIERS" filed on May 28, 2024.

That application is incorporated by reference in its entirety herein.

BACKGROUND

Field of the Art

The present invention is related to the fields of life sciences and public health.

Discussion of the State of the Art

The management and utilization of biospecimens in biomedical research face significant technical challenges, particularly relating to data interoperability, privacy protection, and real-time tracking across disparate institutional systems. Traditionally, donated biospecimens are collected and stored in biobanks or institutional repositories, becoming dissociated from donor identifiers through a de-identification process intended to protect patient privacy. However, this process inherently disrupts continuous feedback loops and hampers researchers' ability to dynamically interact with donors, severely limiting specimen utility, data comprehensiveness, and the overall efficiency of research.

Existing solutions typically involve database-driven platforms acting as institutional 'honest brokers' or intermediary offices tasked with securely storing identifiers. Such processes rely heavily on human oversight, are prone to error, and inherently non-scalable. Additionally, traditional biobank informatics systems are often centralized within individual institutions and depend extensively on pre-established, static legal agreements (data use agreements, DUAs) for data sharing. Such centralized approaches significantly constrain real-time integration capabilities across multiple institutions, limit scalability, and introduce extensive bureaucratic delays, preventing dynamic consent updates and effective multi-party specimen tracking. These current solutions have largely failed to address critical privacy and security concerns adequately, typically necessitating the transfer or storage of personal health information (PHI) outside secure institutional boundaries, thereby raising regulatory compliance risks.

Furthermore, prior attempts at integrating blockchain or distributed ledger technologies for biospecimen tracking have not addressed the need for privacy-preserving identity linkage and have struggled with integration into legacy health record systems. These shortcomings have resulted in limited adoption, compromised data interoperability, and insufficient real-time donor engagement capabilities.

Thus, there remains a substantial unmet technical need for a scalable, secure, and privacy-preserving digital solution capable of linking patients to their biospecimens, enabling real-time dynamic tracking and informed consent updates across heterogeneous research environments without transferring or exposing PHI.

In the field of medical research, vast amounts of human biological specimens and associated data are collected and stored in biobanks and databases across various institutions. These resources are invaluable for advancing our understanding of diseases and developing new treatments. However, the current systems for managing these assets face several challenges that limit their potential utility and impact.

One major problem is the lack of patient engagement and control over their donated specimens and data. Once patients provide informed consent and their samples are collected, they often have little to no visibility into how their contributions are being used and no way to track the impact of their participation. This disconnect between patients and their donated materials can lead to decreased trust and willingness to participate in research.

Another issue is the fragmentation and siloing of patient data across different studies and institutions. Specimens and data from a single patient may be scattered across multiple databases, each with its own unique identifiers and access controls. This makes it difficult to gain a comprehensive view of a patient's contributions/health/biology/experiences and to leverage the full value of their data for research or clinical purposes. Additionally, de-identified samples are useful and current incentive structures create a resistance to change. The de-identified nature of samples is exploited across all industries to enable secondary research and commercial use of clinical biospecimens and data, as well as data and specimens explicitly donated for research purposes, in a manner that is explicitly not accountable to the patient. De-identification practices make the specimens invisible to the respective patient, and the lack of an enabling technology further compounds this issue. As a result, the industry has become extremely resistant to implementing a technical solution, as they would stand to lose control of their 'no-strings-attached' assets, which they have collected, curated, and stored at great expense.

Existing solutions have attempted to address these challenges, but with limited success. Some biobanks and research programs have implemented patient portals or websites where participants can access information about their donated samples, particularly when their samples are used in secondary research or for commercialization purposes. However, these systems often require significant changes to the underlying protocols and infrastructure, making them difficult and costly to implement. They also typically only provide access to data from a single study or institution, rather than a holistic view across all of a patient's contributions.

Despite these advancements, significant problems remain unaddressed in the current landscape of biobanking and research data management. Patients still lack meaningful engagement with and control over their donated specimens and data, leading to potential mistrust and reluctance to participate in research. The fragmentation and siloing of patient data across different studies and institutions persists, hindering the ability to fully leverage the value of these assets for research purposes. Existing patient portals and websites often provide limited access to data from a single study or institution, failing to offer a comprehensive view of a patient's contributions. Moreover, the drive to decentralize health data ownership has thus far been a losing proposition, also because the correct ownership model for digital derivatives is unclear, certainly by comparison to the intuitive clarity we can have about assets that represent physical parts of our body. Organoids, and biospecimens more broadly, have the potential to be the singular use case that course corrects society by firmly establishing the public's understanding of their rights to own their data, starting with this solid-state use case of data assets that are inherently unique, and which have immutable provenance. Critically, these assets are high value, low volume transactions, for which initial one-off use cases can make a difference for peoples' lives, as compared to owning licensing rights for health records, etc., for which any one use is low value, and would require many uses over many years to add up to meaningful financial impact.

While blockchain-based solutions aim to improve transparency and auditability, they have yet to demonstrate the ability to meaningfully engage patients or provide them with granular control over their data. Moreover, many of these solutions face challenges with scalability and interoperability across different institutions, limiting their widespread adoption and impact.

SUMMARY

The present invention addresses the above-mentioned technical problems through a novel digital honest broker platform designed to provide secure, decentralized, and privacy-preserving linkage between biospecimen donors and their samples across multiple research institutions. This technical solution employs advanced cryptographic methods, including encrypted identifier matching and zero-knowledge proofs, to establish secure patient-to-specimen linkages without exchanging or storing PHI externally.

Specifically, the disclosed platform integrates secure application programming interfaces (APIs) that allow real-time queries to institutional databases using cryptographic tokens or encrypted patient identifiers. Institutional systems respond with de-identified specimen codes, thereby enabling the system to dynamically link donors to biospecimens without requiring conventional data-use agreements. This innovative architecture significantly reduces bureaucratic friction, enabling scalable, real-time interoperability across diverse institutional environments.

The platform further incorporates distributed event-logging capabilities, optionally leveraging blockchain or non-fungible tokens (NFTs) for immutable audit trails. Each specimen's lifecycle events-including transfers, research uses, and consent updates—are securely and automatically logged, providing comprehensive tracking and transparent real-time feedback directly to donors through an intuitive graphical user interface.

A key innovation is the dynamic, asynchronous consent management mechanism. The system programmatically identifies scenarios requiring updated consent, automatically triggering consent requests directly to donors, recording their responses digitally, and updating permissions instantaneously across the decentralized network. This technical enhancement significantly surpasses conventional static consent methods, improving both the granularity and responsiveness of consent management in research applications.

This invention uniquely combines privacy-preserving cryptographic identity management, decentralized real-time event tracking, and dynamic consent mechanisms into a cohesive, scalable digital solution. The result is dramatically enhanced operational efficiency, increased specimen utilization, reduced compliance risks, and unprecedented levels of donor engagement in biomedical research activities.

At a high level, the digital honest broker system leverages de-identified ID codes or tokens to link patients to their donated specimens and data across different studies and databases, while maintaining institutional stewardship over the identifiers. This framework allows the system to be seamlessly integrated with existing research protocols and infrastructure without requiring significant changes to the underlying processes.

One aspect of the invention is its ability to enable patients to access and engage with the platform at any time after providing initial consent, rather than limiting their interaction to the point of specimen collection. This ongoing engagement transforms the traditional informed consent process into a dynamic, long-term membership, fostering greater trust and participation in research.

Another feature of the digital honest broker system is its flexibility to be implemented both prospectively and retrospectively. By integrating the technology into established, older systems, dynamic consent can be obtained from users thereby effectively converting a static database to a dynamic which can unlock the value of existing biobanks and databases.

The invention's architecture is designed to be agnostic to the specific database owner or operator, enabling it to plug into and correlate with databases across different institutions. This interoperability allows for the creation of a comprehensive view of a patient's contributions across multiple studies and biobanks, maximizing the utility of their donated specimens and data for research purposes.

By empowering patients with greater transparency and visibility over their research participation, the digital honest broker system has the potential to increase trust and willingness to engage in biomedical research. Also the inclusion of the patient as a stakeholder in the management of their personal specimens/data can overcome institutional resistance to sharing by allowing for a system design that better aligns incentives of all stakeholders. This, in turn, can lead to increased sample and data availability, accelerating scientific discoveries and the development of new treatments.

The present invention provides a more holistic and patient-centric approach to biobanking and research data management, prioritizing meaningful patient engagement and control. The system's ability to integrate with existing infrastructure without requiring significant protocol changes makes it more cost-effective and easier to implement than many existing patient portal solutions. Furthermore, by enabling the aggregation and utilization of patient data across institutions, the invention overcomes the limitations of siloed and fragmented data, unlocking the full potential of these valuable research assets.

The digital honest broker system represents an advancement in the field of biobanking and research data management. By empowering patients, facilitating seamless integration with existing infrastructure, and enabling cross-institutional data utilization, this invention has the potential to revolutionize the way biomedical research is conducted, ultimately leading to faster and more impactful scientific discoveries, lead to greater utilization of specimens, and a more sustainable, scalable biobanking model.

The digital honest broker enables a decentralized biobanking asset exchange platform with several key features. First, it allows institutions with unused specimens to make them available to potential outside users while remaining compliant with established de-identified specimen protocols and policies. This is achieved without compromising the patient's privacy or their ability to track the usage of their specimens. Institutions can pool their available specimens and stake them on the network to add liquidity, granting local investigators credits that can be used to access specimens of interest from other institutions. Second, the platform employs matching algorithms to pair available assets with active research protocols. These algorithms optimize timeliness for precision medicine applications, scientific utility, diversity of patient representation in preclinical research, fairness in allocation, and cost-effectiveness regarding latency and shipping.

The exchange also enables bidirectional collaboration. Scientists can propose protocols or make direct requests for specimens from patients with particular features of interest, without needing to know the individual's identity. In return, scientists gain corresponding rights to access relevant clinical information. Conversely, patients and physicians can propose specimens and crowdsource scientists to perform just-in-time translational research.

The exchange utilizes a tokenized ecosystem, where fungible tokens represent common stores of value, enabling people to contribute and derive value from the exchange at different times and without preexisting relationships. This is achieved without directly monetizing the specimens. Non-fungible tokens are used to represent assets, people, protocols, and relationships between individuals, maintaining mappings and provenance across networks and communities of collaborators. The tokenized ecosystem can be further enhanced with equity and governance tokens, as well as other decentralized identity and DAO protocols that can be transparently layered on top of the platform, driving collaboration and adoption through incentive alignment.

Finally, the decentralized biobanking platform incorporates an embedded governance layer and an ethical oversight watchtower. These components continuously monitor the network, assess market behavior, adjust control levers as needed, and ensure the detection of unanticipated adverse outcomes or disparities that may emerge or be exacerbated. This comprehensive approach ensures that the platform remains transparent, fair, and aligned with the interests of all stakeholders involved in the biobanking ecosystem.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
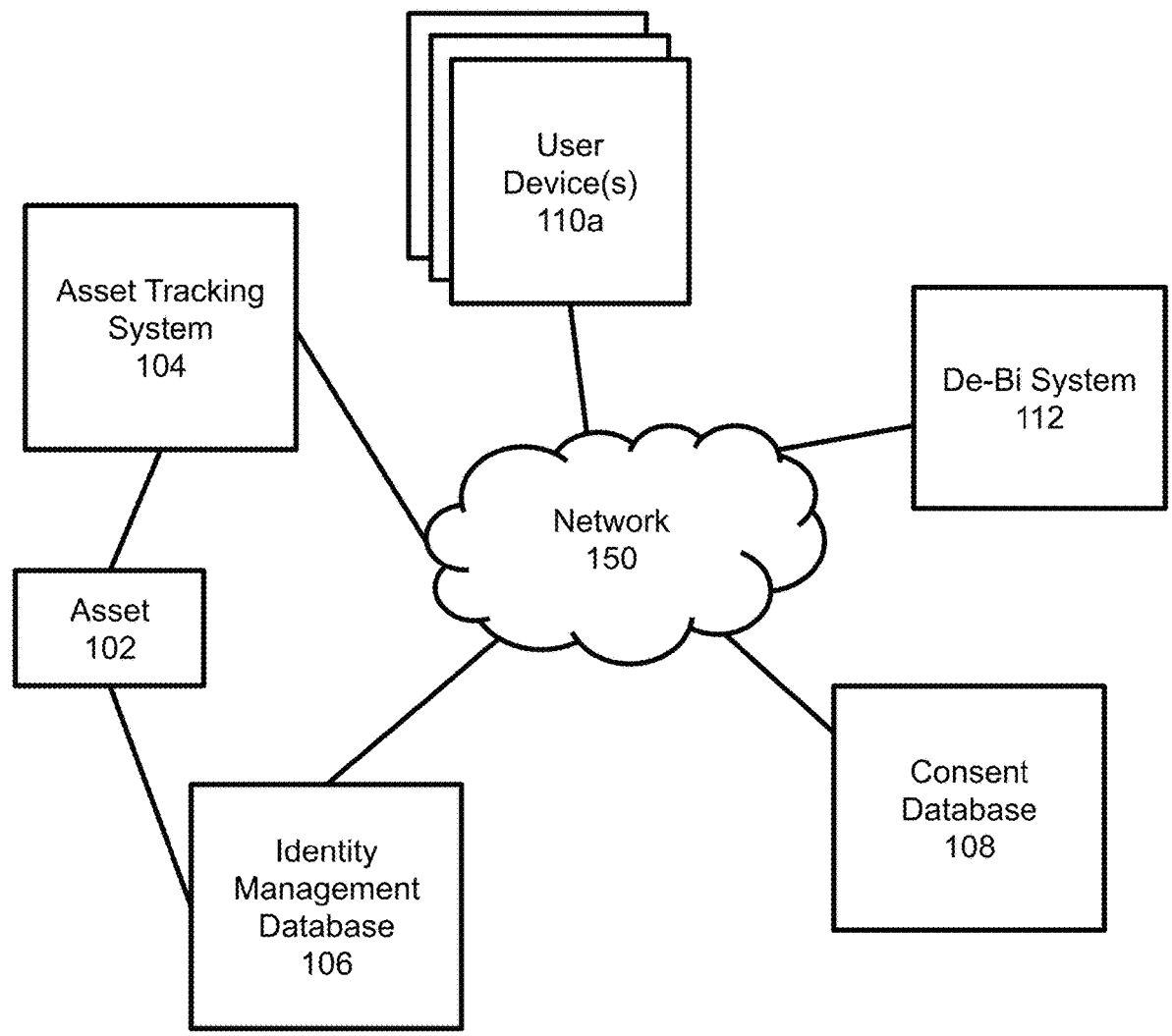
FIG. 1 illustrates a network architecture for systems and methods for digitally connecting patients to de-identified research specimens and data using composable protocols and tokenized identifiers in accordance with an exemplary embodiment of the invention.

The present invention relates to a digital honest broker system and method for managing patient specimens and data in biomedical research. The system addresses challenges associated with patient engagement, data fragmentation, and the utilization of research assets across multiple studies and institutions.

The digital honest broker system utilizes de-identified ID codes or tokens to link patients to their donated specimens and data across different studies and databases while maintaining institutional control over the identifiers. This framework allows for seamless integration with existing research protocols and infrastructure without necessitating substantial changes to the underlying processes.

One aspect of the invention is its ability to enable patients to access and engage with the platform at any time after providing initial consent, rather than limiting their interaction to the point of specimen collection. This ongoing engagement transforms the traditional informed consent process into a dynamic, long-term membership, fostering greater trust and participation in research.

The digital honest broker system is designed to be implemented both prospectively and retrospectively. This flexibility allows the invention to unlock the value of existing biobanks and databases that have been collecting samples and data for many years, in addition to integrating with new and ongoing research initiatives.

The invention's architecture is agnostic to the specific database owner or operator, enabling it to plug into and correlate with databases across different institutions. This interoperability allows for the creation of a comprehensive view of a patient's contributions across multiple studies and biobanks, maximizing the utility of their donated specimens and data for research purposes.

By empowering patients with greater control and visibility over their research participation, the digital honest broker system has the potential to increase trust and willingness to engage in biomedical research. This, in turn, can lead to increased sample and data availability, accelerating scientific discoveries and the development of new treatments.

The present invention offers several advantages over prior solutions. It provides a more holistic and patient-centric approach to biobanking and research data management, prioritizing meaningful patient engagement and control. The system's ability to integrate with existing infrastructure without requiring significant protocol changes makes it more cost-effective and easier to implement than many existing patient portal solutions. Furthermore, by enabling the aggregation and utilization of patient data across institutions, the invention overcomes the limitations of siloed and fragmented data, unlocking the full potential of these valuable research assets.

The Digital Honest Broker (DHB) system enables scientists to access a more comprehensive, longitudinal, and multimodal dataset for their research subjects, similar to how patients can track their specimens across multiple settings. By leveraging the DHB, researchers are able to identify and acquire additional assets from the individuals they are studying, such as data from different time points, modalities, or research studies. This allows scientists to build a more complete picture of each unique individual subject, enhancing the depth and breadth of their research.

Furthermore, the DHB facilitates collaboration among scientists working with data or specimens from the same individual. By identifying these connections, researchers can engage in case-based research data fusions, combining their expertise and resources to unlock new insights and discoveries. This collaborative approach exponentially increases the potential for multimodal data fusion and the development of powerful machine learning models.

The key enabler for these advancements is the DHB's ability to provide privacy-preserving linkage and aggregation of de-identified datasets that already exist but were previously viewed in isolation, as if they were separate entities (Sybils). By reintegrating the entirety of an individual patient's data, the DHB breaks down the silos that have hindered scientific progress and opens up new avenues for research and discovery. This holistic approach to patient data management revolutionizes the way biomedical research is conducted, ultimately leading to better outcomes for patients and society as a whole.

In summary, the digital honest broker system represents an advancement in the field of biobanking and research data management. By empowering patients, facilitating seamless integration with existing infrastructure, and enabling cross-institutional data utilization, this invention has the potential to revolutionize the way biomedical research is conducted, ultimately leading to faster and more impactful scientific discoveries.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Network Architecture

FIG. 1 illustrates an exemplary embodiment of a system and method for digitally connecting patients to de-identified research specimens and data using composable protocols and tokenized identifiers according to one embodiment. In accordance with an embodiment, the various components of the inventive system and/or method may comprise an specimen 102, an asset tracking system 104, an identity management database 106, a consent database 108, De-Bi system 112, user device(s) 110, and network 150. The various components described herein are exemplary and for illustration purposes only and any combination or subcombination of the various components may be used as would be apparent to one of ordinary skill in the art. The system may be reorganized or consolidated, as understood by a person of ordinary skill in the art, to perform the same tasks on one or more other servers or computing devices without departing from the scope of the invention.

The Specimen 102 represents the physical or digital biospecimen that is collected from patients and stored in biobanks or databases.

In one exemplary embodiment, when a patient undergoes a medical procedure, such as surgery, a tissue sample is taken and sent to the pathology lab. The pathology lab analyzes the sample and sends the results back to the patient and their oncologist. Any remaining tissue that is not needed for the patient's medical care is considered "extra". Normally, this extra tissue is either stored in a pathology archive, which is required by law and considered part of the patient's medical record, or it is discarded. However, in some cases, if the pathologist deems it acceptable and there is sufficient extra tissue, a portion of the sample may be sent to a biobank. The biobank can then store the sample in a freezer for later use in research, or the sample can be used immediately for fresh tissue research, such as growing organoids.

When a sample is sent to the biobank, it is given a unique de-identified barcode or ID code. This allows the sample to be tracked and associated with the patient's medical data without revealing the patient's identity. The biobank maintains a database that links the de-identified ID code to the patient's identifying information, but researchers who receive samples from the biobank only receive the de-identified code.

In other words, the Specimen 102 is the physical or digital biospecimen collected from patients during medical procedures. It is labeled with a unique de-identified ID code by the biobank and can be stored for later use or used immediately in research. The Specimen 102 is a critical component of the biomedical research ecosystem and is closely linked to the patient's identity, and therefore may be connected to their medical data through the de-identified ID code.

In one embodiment, the Asset Tracking System 104 is a centralized database and tracking system that enables the efficient management and tracking of biospecimens and associated data throughout the research lifecycle. By integrating with other components of the biomedical research ecosystem and capturing detailed information about each specimen, the Asset Tracking System 104 plays a critical role in enabling the effective utilization of biospecimens in research while maintaining the privacy and security of patient data.

The Asset Tracking System 104 is a component of the biomedical research ecosystem that enables the tracking and management of physical and digital biospecimens and associated data. At a high level, the Asset Tracking System 104 is responsible for maintaining a detailed record of each biospecimen's location, status, and associated metadata throughout its lifecycle, from collection to utilization in research, including in the creation of derivative works or assets.

A function of the Asset Tracking System 104 is to provide a centralized database for storing and managing information related to biospecimens. This includes details such as the unique de-identified ID code assigned to each specimen, the type of specimen (e.g., tissue, blood, or other biological material), the date and time of collection, the associated patient data (in de-identified form), and the current location and status of the specimen (e.g., in storage, in transit, or in use by a researcher).

To achieve this, the Asset Tracking System 104 works by integrating with various other components of the biomedical research ecosystem. When a new specimen is collected and sent to the biobank, the Asset Tracking System 104 receives information about the specimen from the source study database or the identity management database. This information includes the unique de-identified ID code assigned to the specimen, which allows the Asset Tracking System 104 to create a new record for the specimen in its database.

As the specimen moves through the research lifecycle, the Asset Tracking System 104 is updated with new information about its status and location. For example, when a specimen is requested by a researcher and sent out from the biobank, the Asset Tracking System 104 is updated to reflect that the specimen is now in transit. When the specimen arrives at the researcher's lab, the Asset Tracking System 104 is updated again to indicate that the specimen is now in use.

The Asset Tracking System 104 may also integrate with other systems, such as laboratory information management systems (LIMS), to capture additional data about the specimen as it is used in research. This could include data such as the results of experiments performed on the specimen, any derivatives or products created from the specimen, and any publications or patents resulting from the research.

Alternatives to the Asset Tracking System 104 could include manual tracking methods, such as spreadsheets or paper records. However, these methods are often error-prone and difficult to scale as the number of specimens and associated data grows. Other alternatives could include decentralized tracking systems, where each entity in the research ecosystem (e.g., biobanks, labs, and researchers) maintains its own records. However, this approach can lead to data silos and difficulties in sharing and integrating information across the ecosystem.

The Identity Management System 106, in accordance with an embodiment of the invention, is a secure database system that stores and manages patient identity information and associated de-identified ID codes. This system is typically controlled by an organization associated with a lead researcher, such as a university or research institution.

At a high level, the Identity Management System 106 serves as a central repository for patient identity information and acts as a link between patient identities and their corresponding de-identified ID codes. The system is designed to maintain patient privacy and confidentiality while enabling researchers to access and utilize patient data and specimens for approved research purposes.

The primary function of the Identity Management System 106 is to store and manage patient identity information, such as name, date of birth, and contact information, along with their associated de-identified ID codes. These ID codes are used to label and track patient specimens and data throughout the research lifecycle, allowing researchers to access and analyze patient data without being able to identify the specific individuals involved.

To ensure patient privacy and confidentiality, the Identity Management System 106 may employ access controls and security measures. Only authorized personnel, such as the lead researcher or designated staff members, are granted access to the system and the patient identity information stored within it. These individuals are responsible for managing patient enrollment, generating de-identified ID codes, and maintaining the integrity and security of the patient identity data.

When a new patient is enrolled in a research study, their identity information is entered into the Identity Management System 106, and a unique de-identified ID code is generated and associated with their record. This ID code is then used to label any specimens or data collected from the patient, allowing the specimens and data to be tracked and analyzed without revealing the patient's identity.

In one embodiment, the Identity Management System 106 is embodied in a REDCAP database, but may also be embodied in other databases as would be apparent to a person of ordinary skill in the art.

In one embodiment, the Consent Database 108, also sometimes referred to as the de-bi REDCap database herein, is a database system that stores and manages patient consent information and associated anonymous tokens. The Consent Database 108 is designed to work in conjunction with the Identity Management System 106 and other components of the research ecosystem to facilitate the tracking and management of patient consent and the association of anonymous tokens with patient records. Broadly, the Consent Database 108 serves as a repository for storing and managing patient consent information, such as the date and time of consent, the specific research study or studies for which consent was provided, and any associated consent documents or forms. The database also stores anonymous tokens that are generated and associated with each patient's consent record.

When a new patient provides consent to participate in a research study, their consent information is entered into the Consent Database 108. If the patient does not already have an account in the system, the Consent Database 108 interfaces with, in accordance with a non-limiting embodiment, a Firebase authentication system through a JIRA API to create a new account for the patient. The Firebase authentication system generates a unique anonymous token, which is then stored in the Consent Database 108 and associated with the patient's consent record.

The anonymous token serves as a secure and de-identified means of linking patient consent information with their specimens and data stored in other components of the research ecosystem, such as the Asset Tracking System 104. The Consent Database 108 communicates with these other systems, sharing the anonymous token and enabling the association of patient consent with their specimens and data without revealing their identity.

The Consent Database 108 may also store additional information related to patient consent, such as any specific preferences or limitations expressed by the patient regarding the use of their specimens or data, or any revocations or modifications of their consent over time. The database is designed to be secure and compliant with relevant privacy and data protection regulations, such as HIPAA in the United States.

In one embodiment, the Consent database 108 is embodied in a REDCAP database, but may also be embodied in other databases as would be apparent to a person of ordinary skill in the art. In other embodiments, the consent database 108 may be implemented by using systems and workflows used in the research environment, such as the Firebase authentication system and the JIRA API.

In one embodiment, the de-bi system 112 is a software platform that enables patients or sample donors to track their donated samples and associated research data, as well as monitor their contribution to the studies they have consented to participate in. The system provides a user-friendly interface for patients to access and manage their information, promoting transparency and engagement in the research process.

At a high level, the de-bi system 112 functions as a centralized hub for patients to view and interact with their research-related data. The system integrates with various components of the research ecosystem, such as the Consent Database 108, and the Asset Tracking System 104, to gather and present relevant information to the patient in a secure and de-identified manner.

In one embodiment, when a patient creates an account or signs in to the de-bi system 112, the system generates or retrieves their unique Firebase User ID (UID). This UID serves as an anonymous identifier for the patient within the system. The de-bi system 112 communicates with the Firebase authentication system via the Zebra API to create and manage patient accounts, ensuring secure access to their data.

Once the patient's account is created or verified, the de-bi system 112 stores the UID in the consent database 108. This allows the system to associate the patient's UID with their consent information, specimen data, and other relevant research records-without disrupting existing systems and frameworks that research institutions or other organizations already use to track patient samples and consent for various studies.

As the patient's samples are collected, processed, and utilized in research studies, the de-bi system 112 receives updates from the Asset Tracking System 104 and other components of the research ecosystem. These updates include information such as the barcode assigned to the patient's specimen and the associated case number, which are anonymous identifiers used to track the specimen and related data without revealing the patient's identity.

The de-bi system 112 stores the barcode and case number information in the consent database 108, linking it to the patient's UID. This enables the system to present a comprehensive view of the patient's contributed samples and associated research data within their personalized dashboard.

Through the de-bi system 112 interface, patients can view details about their donated specimens, such as the type of sample, collection date, and current status (e.g., in storage, processing, or analysis). They can also access information about the research studies utilizing their samples, including study objectives, progress updates, and any published findings or outcomes.

User device(s) 110 may be used by users to log-into their de-bi accounts to track and view their samples and the associated studies that they are enrolled in. User devices 110 include, generally, a computer or computing device including functionality for communicating (e.g., remotely) over a network 150. Data may be collected from user devices 110, and data requests may be initiated from each user device 110. User device(s) 110 may be a server, a desktop computer, a laptop computer, personal digital assistant (PDA), an in-or out-of-car navigation system, a smart phone or other cellular or mobile phone, or mobile gaming device, among other suitable computing devices. User devices 110 may execute one or more applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 110 may be an electronic device including hardware, software, or embedded logic components or a combination of two or more such components and capable of carrying out the appropriate functions implemented or supported by the user device 110. For example and without limitation, a user device 110 may be a desktop computer system, a notebook computer system, a netbook computer system, a handheld electronic device, or a mobile telephone. The present disclosure contemplates any user device 110. A user device 110 may enable a network user at the user device 110 to access network 150. A user device 110 may enable its user to communicate with other users at other user devices 110.

A user device 110 may have a web browser, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user device 110 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 110 one or more Hyper Text Markup Language (HTML) files responsive to the HTTP request. The user device 110 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110 may also include an application that is loaded onto the user device 110. The application obtains data from the network 150 and displays it to the user within the application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiments, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

System Architecture

Figure 2:
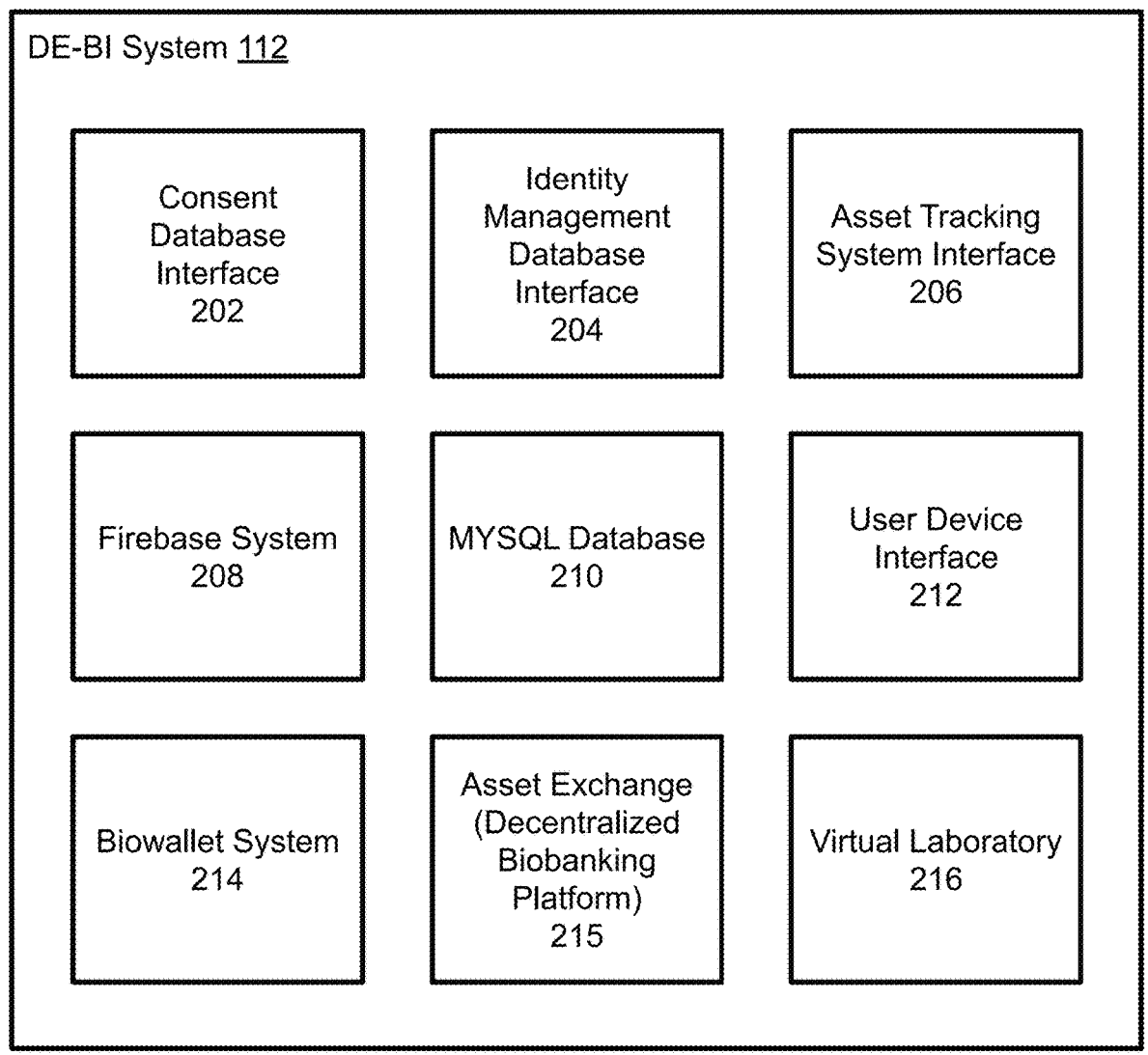
FIG. 2 illustrates a system architecture for systems and methods for digitally connecting patients to de-identified research specimens and data using composable protocols and tokenized identifiers in accordance with an exemplary embodiment of the present invention.
Figure 3:
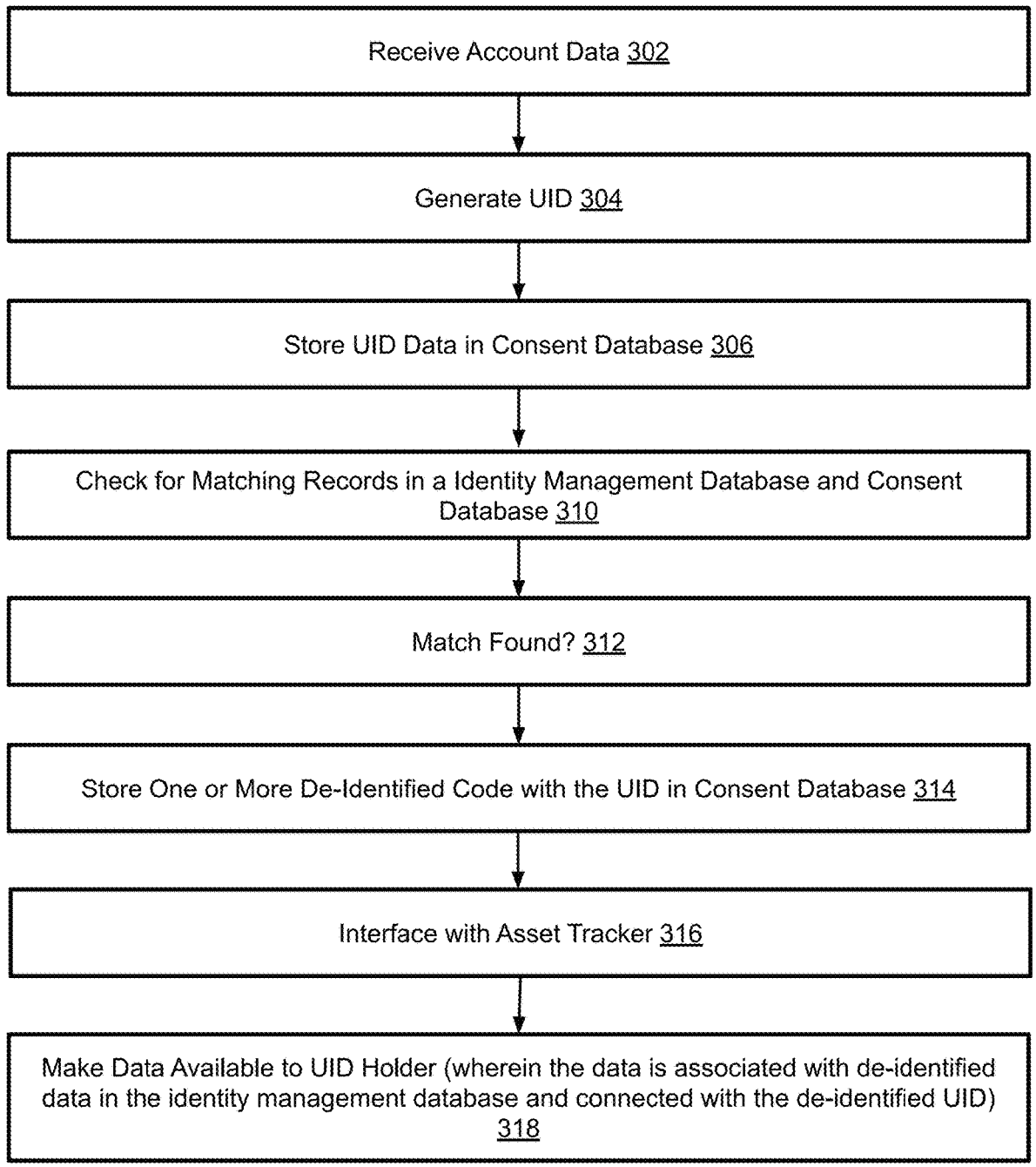
FIG. 3 illustrates an exemplary computer implemented process for systems and methods for digitally connecting patients to de-identified research specimens and data using composable protocols and tokenized identifiers according to one embodiment of the invention.

FIG. 2 illustrates an exemplary embodiment of the de-bi system 112. In one embodiment, it is comprised of a consent database interface 202, an identity management database interface 204, asset tracking system interface 206, firebase system 208, a mysql database 210, a user device interface 212, a bio wallet system 214, and a virtual laboratory 216. The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention.

All functions of the components discussed herein may be initiated manually or may be automatically initiated when the criteria necessary to trigger action have been met.

In one embodiment, the Consent Database Interface 202 is a subsystem of the de-bi system 112 that facilitates the communication and data exchange between the de-bi system 112 and the Consent Database 108. The primary function of the Consent Database Interface 202 is to store and retrieve de-identified User IDs (UIDs) associated with patient consent records.

At a high level, the Consent Database Interface 202 acts as an intermediary between the de-bi system 112 and the Consent Database 108, enabling seamless integration and synchronization of consent-related information. The interface is responsible for handling the secure transfer of de-identified UIDs and ensuring the integrity and consistency of the data exchanged between the two systems.

When a patient grants consent to participate in a research study, their consent information is stored in the Consent Database 108, along with a generated de-identified UID. The Consent Database Interface 202 facilitates the storage of this UID in the Consent Database 108 by establishing a secure connection and transmitting the necessary data.

Similarly, when the de-bi system 112 requires access to a patient's consent information or needs to verify their participation in a specific study, the Consent Database Interface 202 retrieves the relevant de-identified UID from the Consent Database 108. The interface sends a request to the Consent Database 108, specifying the required information, and receives the corresponding UID in response.

The Consent Database Interface 202 may utilize various communication protocols and APIs to interact with the Consent Database 108, such as RESTful web services, SOAP, or database-specific protocols like ODBC or JDBC. The choice of protocol depends on the specific implementation and the compatibility requirements of the Consent Database 108.

To ensure the security and privacy of the sensitive consent-related information, the Consent Database Interface 202 employs encryption techniques and secure communication channels. This protects the data from unauthorized access or interception during transmission between the de-bi system 112 and the Consent Database 108.

Alternatives to the Consent Database Interface 202 could include direct integration between the de-bi system 112 and the Consent Database 108, without the use of a dedicated interface. However, this approach may lead to tighter coupling between the two systems, making it more difficult to maintain, scale, or update them independently. Another alternative could be the use of a message queue or a publish-subscribe model, where the Consent Database 108 publishes consent-related events, and the de-bi system 112 subscribes to these events to receive updates. However, this approach may introduce additional complexity and latency in the data exchange process.

In one embodiment, the Match Engine 204 is a subsystem of the de-bi system 112 that is responsible for identifying matches between the data stored in the Consent Database 108 and the Identity Management System Database 106. The primary function of the Match Engine 204 is to ensure that the de-bi system 112 has access to the necessary de-identified information to enable patients to track the progress and status of their donated biospecimens without compromising their privacy.

At a high level, the Match Engine 204 compares the data in the Consent Database 108 with the data in the Identity Management System Database 106 to find corresponding records. When a match is found, the Match Engine 204 retrieves the relevant de-identified information, such as the barcode and case number associated with the patient's donated biospecimens, and updates the Consent Database 108 with this information.

The Match Engine 204 works by periodically querying the Consent Database 108 and the Identity Management System Database 106 for new or updated records. It then applies a set of predefined matching criteria to identify records that correspond to the same patient. These criteria may include factors such as the patient's de-identified UID, the study or studies they have consented to participate in, and any additional de-identified data points that can help establish a match.

When a match is found, the Match Engine 204 retrieves the barcode and case number associated with the patient's donated biospecimens from the Identity Management System Database 106. The barcode is an anonymous identifier assigned to the physical biosample, while the case number is an anonymous identifier assigned to the patient. The Match Engine 204 then updates the Consent Database 108 with this information, linking the patient's consent record with their donated biospecimens.

By storing the barcode and case number in the Consent Database 108, the de-bi system 112 can provide patients with information about the status and progress of their donated biospecimens without directly accessing any personally identifiable information. This allows patients to track their contributions to research while maintaining their privacy and anonymity.

The Match Engine 204 may employ various algorithms and techniques to perform the matching process efficiently and accurately. These could include fuzzy matching algorithms to account for minor discrepancies in the data, or machine learning models trained to identify matches based on patterns in the data.

In one embodiment, the Asset Tracking System Interface 206 is a subsystem of the de-bi system 112 that facilitates communication and data exchange between the de-bi system 112 and the Asset Tracking System 104. The primary function of the Asset Tracking System Interface 206 is to retrieve or receive updates about a patient's biospecimens, enabling the de-bi system 112 to provide patients with information about the status and progress of their donated specimens.

At a high level, the Asset Tracking System Interface 206 acts as a bridge between the de-bi system 112 and the Asset Tracking System 104, allowing the two systems to share information securely and efficiently. The interface is responsible for handling the communication protocol, data format, and authentication mechanisms required to interact with the Asset Tracking System 104.

The Asset Tracking System Interface 206 works by sending requests to the Asset Tracking System 104 to retrieve information about a patient's biospecimens. These requests include the relevant de-identified identifiers, such as the barcode or case number associated with the biospecimens, which were previously obtained through the Match Engine 204 and stored in the Consent Database 108.

Upon receiving a request, the Asset Tracking System 104 queries its database to find the corresponding biosample records and returns the requested information to the Asset Tracking System Interface 206. This information may include details such as the current location of the biospecimens, the processing status, any derived data or analysis results, and other relevant metadata.

The Asset Tracking System Interface 206 then processes the received data and updates the de-bi system 112 with the latest information about the patient's biospecimens. This allows the de-bi system 112 to provide patients with accurate and up-to-date information about their donated specimens through a user-friendly interface, such as a web portal or mobile application.

To ensure the security and integrity of the data exchanged between the de-bi system 112 and the Asset Tracking System 104, the Asset Tracking System Interface 206 employs various security measures. These may include encryption of the data in transit, authentication mechanisms to verify the identity of the communicating systems, and access controls to restrict unauthorized access to sensitive information.

The Asset Tracking System Interface 206 may utilize different communication protocols and data formats, depending on the specific implementation of the Asset Tracking System 104. Common protocols include RESTful APIs, SOAP web services, or message queues. The choice of protocol and data format depends on factors such as the scalability, performance, and interoperability requirements of the systems involved.

Alternatives to the Asset Tracking System Interface 206 could include direct database access, where the de-bi system 112 directly queries the database of the Asset Tracking System 104 to retrieve information about the biospecimens. Another alternative could be a file-based data exchange, where the Asset Tracking System 104 periodically exports biosample data to a file, which is then imported by the de-bi system 112.

In one embodiment, the Firebase System 208 and the MySQL System 210 are subsystems of the de-bi system 112 that work together to store, manage, and retrieve data related to patient accounts, de-bi consent records, and biosample information.

The Firebase System 208 is a cloud-based platform that provides authentication, real-time database, and other back-end services for web and mobile applications. In the context of the de-bi system 112, the Firebase System 208 is primarily used for user authentication and management. When a patient creates an account or logs into the de-bi system 112, the Firebase System 208 handles the authentication process, ensuring that only authorized users can access the system and their personal data.

The Firebase System 208 also stores user account information, such as email addresses and UIDs (User IDs), which serve as unique identifiers for each patient within the de-bi system 112. The Firebase System 208 provides a secure and scalable infrastructure for managing user accounts, allowing the de-bi system 112 to handle a large number of users efficiently.

The MySQL System 210 is a relational database management system that is used to store and manage the majority of the data in the de-bi system 112. This includes data related to patient consent records, biosample metadata, and any other relevant information that needs to be persisted and retrieved by the system.

The MySQL System 210 works by organizing data into tables, where each table represents a specific entity or concept within the system, such as consent records or biospecimens. The tables are structured using a predefined schema that defines the fields and relationships between the data elements. The de-bi system 112 interacts with the MySQL System 210 using SQL (Structured Query Language) commands to store, retrieve, update, and delete data as needed.

The Firebase System 208 and the MySQL System 210 work together to provide a comprehensive data management solution for the de-bi system 112. For example, when a patient grants consent to the de-bi system 112, the consent record is stored in the MySQL System 210, along with any relevant metadata. At the same time, the patient's UID, which is stored in the Firebase System 208, is associated with the consent record, allowing the de-bi system 112 to link the patient's account with their consent information.

Similarly, when a patient requests information about their donated biospecimens, the de-bi system 112 retrieves the relevant data from the MySQL System 210 using the patient's UID as a key, which is linked to de-identified data associated with a user in the asset tracking system 104 and the identity management database 106. This allows the system to provide personalized and secure access to the patient's data, while maintaining the privacy and integrity of the information.

Firebase and MySQL are terms that are used for convenience herein and are not intended to limit the invention to only these implementations. Alternatives to the Firebase System 208 and the MySQL System 210 could include other cloud-based authentication and database services, such as AWS Cognito and DynamoDB, or Microsoft Azure Active Directory and SQL Database. These alternatives offer similar functionality and can be used interchangeably depending on the specific requirements and preferences of the de-bi system 112 implementation. Another alternative could be to use a single, integrated database system that combines both user authentication and data storage capabilities, such as MongoDB or CouchDB. These systems provide a more unified approach to data management, potentially simplifying the architecture of the de-bi system 112. However, they may lack some of the specialized features and scalability offered by dedicated authentication and relational database systems like Firebase and MySQL.

In one embodiment, the User Device Interface 212 is a subsystem of the de-bi system 112 that enables communication and interaction between the de-bi system 112 and the User Devices 110. The primary function of the User Device Interface 212 is to provide users with access to the features and functionalities of the de-bi system 112, allowing them to view, manage, and update information related to their donated biospecimens and consent records.

At a high level, the User Device Interface 212 acts as a gateway between the User Devices 110 and the de-bi system 112, facilitating the exchange of data and commands between the two entities. The interface is responsible for presenting a user-friendly interface to the users, typically in the form of a web-based application or a mobile app, and translating user actions into appropriate requests to the de-bi system 112.

The User Device Interface 212 works by exposing a set of APIs (Application Programming Interfaces) or endpoints that the User Devices 110 can interact with. These APIs define the communication protocol, data format, and available operations that the User Devices 110 can use to access the features of the de-bi system 112.

When a user interacts with the de-bi system 112 through their User Device 110, the User Device Interface 212 receives the user's input, such as login credentials, consent form submissions, or requests for biosample information. The interface then validates the input, ensures that the user is authenticated and authorized to perform the requested action, and forwards the request to the appropriate subsystem within the de-bi system 112.

For example, when a user logs in to the de-bi system 112 through the User Device Interface 212, the interface communicates with the Firebase System 208 to authenticate the user's credentials. Once the user is authenticated, the User Device Interface 212 retrieves the relevant user data from the MySQL System 210 and presents it to the user in a secure and user-friendly manner.

Similarly, when a user submits a consent form through the User Device Interface 212, the interface captures the user's input, validates it, and forwards it to the Consent Database Interface 202 for storage in the Consent Database 108. The User Device Interface 212 also communicates with the Match Engine 204 to initiate the process of matching the user's consent record with their donated biospecimens.

To ensure the security and privacy of the user's data, the User Device Interface 212 employs various security measures, such as encryption of the data in transit, secure authentication mechanisms, and access controls. The interface may also implement rate limiting and input validation techniques to protect against potential attacks or misuse of the system.

Alternatives to the User Device Interface 212 could include other types of user interfaces, such as command-line interfaces (CLIs) or voice-based interfaces, depending on the specific needs and preferences of the users. However, web-based and mobile app interfaces are the most common and user-friendly options for systems like the de-bi system 112.

Another alternative could be to use third-party user interface platforms or frameworks, such as Angular, React, or Flutter, to build the User Device Interface 212. These platforms provide pre-built components and tools that can accelerate the development process and ensure a consistent and responsive user experience across different devices and screen sizes.

In one embodiment, the biowallet system 214 is a subsystem of the de-bi system 112 that provides users with a secure and personalized interface to manage and track their donated biospecimens and associated data. The primary function of the biowallet system 214 is to empower users with insights and trust/transparency over their biological data and enable them to monitor the usage and impact of their contributions to research studies. In other words, The biowallet tracks the specimens and presents this information to the patients, even as the specimens may change hands, be utilized, fractionalized, modified and input into various subsequent projects and products.

At a high level, the biowallet system 214 acts as a digital wallet or repository for a user's biosample-related information, consent records, and research participation history. The system aggregates data from various sources within the de-bi system 112, such as the Consent Database 108, the Identity Management System Database 106, and the Asset Tracking System 104, and presents it to the user in a unified and intuitive interface.

The biowallet system 214 works by retrieving and organizing data related to a user's biospecimens and consent records based on their unique identifier (UID). When a user accesses their Bio Wallet through the User Device Interface 212, the Bio Wallet System 214 communicates with the Firebase System 208 to authenticate the user and retrieve their UID.

Using the UID, the biowallet system 214 queries the MySQL System 210 to fetch the user's consent records, biosample metadata, and any other relevant information stored in the database. The system then processes and analyzes this data to generate a comprehensive overview of the user's research participation, including the types of biospecimens donated, the studies they have consented to, and the current status of their samples.

The biowallet system 214 also communicates with the Asset Tracking System Interface 206 to retrieve real-time updates on the location, processing status, and usage of the user's biospecimens. This information is presented to the user through interactive visualizations, such as timelines, graphs, or maps, allowing them to easily track the journey of their samples from collection to utilization in research, to implementation in various clinical and commercial applications.

In addition to providing users with a centralized view of their biosample data, the biowallet system 214 may also offer additional features and functionalities, such as: Consent management: Users can review, update, or withdraw their consent for specific studies or sample usage through the Bio Wallet interface. Data sharing preferences: Users can set preferences for how their specimens and other data can be shared or used by researchers, such as specifying any restrictions or conditions on the use of their samples. Notifications and alerts: The Bio Wallet System 214 can send users notifications or alerts when their samples are used in new studies, when research findings are available within the virtual lab 216 or published in available forums or publications, or when there are any significant updates to their consent status. Gamification and rewards: To incentivize user engagement and participation, the Bio Wallet System 214 may incorporate gamification elements, such as badges, points, or leaderboards, to recognize and reward users for their contributions to research, and to encourage the vital collection of serial specimens from each individual at various time points.

In one embodiment, the Virtual Laboratory 216 is a subsystem of the de-bi system 112 that provides a collaborative and interactive environment for researchers to access, analyze, and share data related to biosamples and associated research studies. The primary function of the Virtual Laboratory 216 is as a privacy-preserving social network that connects bench and bedside to facilitate community-engaged research, to support longitudinal follow up, dynamic collaboration and data sharing, enabling researchers to communicate insights from the rich biosample data collected through the de-bi system 112 directly with their respective specimen donors, and enabling donors to provide feedback and additional data to enrich the protocol dataset over time.

At a high level, the Virtual Laboratory 216 acts as a centralized platform where researchers can access and share de-identified biosample data, perform analyses, collaborate with peers, and disseminate their findings. The subsystem integrates data from various sources, such as the Asset Tracking System 104, the Identity Management System Database 106, and the Consent Database 108, and provides researchers with tools and interfaces to explore and interrogate this data. Virtual Laboratories 216 unite individuals who are collaborating in specific research protocols, connecting scientists studying specimens/data from the same patient and/or similar patients, connecting patients within a given investigator's research portfolio, including within specific protocols, and connecting patients with 'available' specimens with one another in virtual lab settings where investigators may propose various protocols and patients may vote on specimen allocations based on their interests and preferences.

The Virtual Laboratory 216 works by providing researchers with secure access to the de-identified biosample data through a web-based or mobile app interface. Researchers can log in to the Virtual Laboratory 216 using their credentials, which are authenticated through the Firebase System 208. Once authenticated, researchers can access a dashboard or use a chatbot that presents an overview of the available biosample data, research studies, and any ongoing collaborations, based on researchers' inputs about relevant interests, specimen types, populations and studies.

Researchers can then use the Virtual Laboratory 216 to: Browse and search biosample data: The subsystem provides a search interface that allows researchers to query the available biosample data based on various criteria, such as sample type, disease condition, demographic information, or consent status. Search interfaces incorporate structured and unstructured, natural language queries. Analyze biosample data: The Virtual Laboratory 216 offers a range of analytical tools and workflows that researchers can use to process and analyze the biosample data. These tools may include statistical analysis packages, data visualization libraries, or machine learning algorithms that can help researchers uncover patterns, associations, or biomarkers within the data. Collaborate with peers: The subsystem supports collaboration among researchers by providing features such as shared workspaces, version control, no-and-low-code tooling and privacy-preserving communication tools. Researchers can invite colleagues, physicians and patients to join their projects, share data and analyses, and work together on manuscripts or grant proposals. Share and publish findings: The Virtual Laboratory 216 integrates with existing research dissemination platforms, such as preprint servers or academic journals, independent/publicly available data repositories, federally funded resources (e.g., NIH Reporter) linking grant funding and related patents, supporting researchers to seamlessly share their findings with the broader scientific community while simultaneously providing personalized feedback to the individual donors whose biospecimens were used. The subsystem may also provide tools for generating interactive data visualizations or creating data packages that can be shared alongside publications or provided to grantors, e.g., detailed data and metrics regarding quantified community outreach and engagement activities, thereby facilitating basic and translational scientists to fulfill community engagement requirements.

To ensure the security and privacy of the biosample data, the Virtual Laboratory 216 implements strict access controls and data governance policies. Researchers are only granted access to de-identified data, and their identities will be protected within the system unless they explicitly choose to disclose their identity, or unless otherwise permitted by a specific protocol (e.g. and identified research protocol) or patient-initiated disclosures. The subsystem may also employ techniques such as data encryption, auditing, data minimization and secure data transfer protocols to maintain the integrity and confidentiality of the data, while at the same time ensuring that patients are able to benefit from research on their biospecimens, acknowledging that there may be times when there are irresolvable tradeoffs between privacy and utility of data, and other times when patient and research alike may prefer to self-identify within the context of their direct relationship, though this will be facilitated in a secure and discreet manner within the system, without requiring the broader community to be aware of the identities of the connected individuals, similar to how a patient-physician relationship is internally transparent/identified but not publicly discoverable.

Computer Implemented Process

The process steps described herein may be performed in association with a system such as that described in FIG. 1 and/or FIG. 2 above or in association with a different system. The process may comprise additional steps, fewer steps, and/or a different order of steps without departing from the scope of the invention as would be apparent to one of ordinary skill in the art.

In one embodiment, the software process begins with the "Receive Account Data 302" step, which involves receiving user sign-in data. At a high level, this step captures the user's authentication information, such as their email address or username, and verifies their identity. The process works by comparing the provided sign-in data against the stored user records in the system's database. If a match is found, the user is authenticated and granted access to the system.

Alternatives to this step could include using third-party authentication providers, such as Google or Facebook, or implementing biometric authentication methods like fingerprint or facial recognition, or using commercially available self-sovereign identity authentication and/or KYC mechanisms.

Once the user is authenticated, the process moves to the "Generate UID 304" step, which involves generating a de-identified identifier for the user. This step creates a unique identifier (UID) that is not directly linked to the user's personal information, ensuring their privacy and confidentiality. The UID is typically generated using a secure algorithm, such as a cryptographic hash function or a random number generator. Alternatives to this step could include using existing de-identification techniques, such as tokenization or pseudonymization, or leveraging external identity management systems that provide de-identified user IDs.

After the UID is generated, the process proceeds to the "Store UID in Consent Database 306" step. This step involves storing the generated UID in a dedicated consent database, which maintains a record of the user's consent to participate in research studies or share their data. The UID is associated with the user's consent record, allowing the system to track and manage their permissions without exposing their personal information. Alternatives to this step could include storing the UID in a distributed ledger, such as a blockchain, to enhance the security and immutability of the consent records. The de-bi system's consent database is flexible in its implementation and can be hosted either on the biospecimen collecting institution's server or independently by de-bi. In the future, de-bi may offer a direct-to-consumer option, which would include a secure identity and consent management system. This system would search through various institutional databases, looking for indicators that a client's specimens are part of a specific research protocol. In one embodiment, it is important to differentiate between the consent database that records consent for the de-bi system and the consent databases for the "source studies" or original research protocols. When individuals consent to the de-bi protocol, they may do so either directly through a de-bi sponsored study or indirectly through a study sponsored by a university or other institution. In either case, the de-bi system creates or initiates the creation of a consent ledger, which is hosted on or accessible to the biospecimen collecting institution's databases or servers. This consent database primarily records the individual's consent to participate in the de-bi protocol, which includes permission to check for their consent to other protocols. The individual's personal identifiers, such as name and date of birth, do not need to be disclosed to the de-bi system. Instead, these identifiers are held securely, like a private key, by the institution. The de-bi system then uses this private key to check other consent databases for matches, potentially employing zero-knowledge proofs (ZKP) or other mechanisms to verify if the patient has consented to those other protocols or to confirm a match if they consent to them in the future. This approach allows institutions to maintain the privacy of their study participants' identities while still enabling the de-bi system to link specimens and data across different studies and institutions. The institutions only need to confirm if a consenting individual matches a particular name that has consented to the de-bi protocol. If a match is found, the institutions share only the related de-identified codes, such as case numbers and specimen numbers, with the de-bi system.

The process then moves to the "Check for Matching Records in the Identity Management Database and Consent Database 310" step. This step involves searching for records in the identity management database and consent database that match the user's information. The process compares the user's sign-in data or other identifying information against the records in these databases to establish a link between the user's identity and their consent preferences. Alternatives to this step could include using fuzzy matching algorithms or machine learning techniques, and/or humans-in-the-loop, to improve the accuracy and efficiency of the record matching process.

If a match is found in the previous step, the process proceeds to the "Store De-identified Data from the Identity Management Database with the UID in the Consent Database 314" step. This step involves retrieving the relevant de-identified data associated with the user from the identity management database and storing it alongside the UID in the consent database. This allows the system to maintain a comprehensive record of the user's information without compromising their privacy. Alternatives to this step could include using secure multi-party computation, zero knowledge proofs, or homomorphic encryption techniques to enable privacy-preserving data linkage and analysis.

The process then moves to the "Interface with Asset Tracker 316" step, which involves communicating with an external asset tracking system to retrieve information about the user's biosamples or other research-related assets. This step enables the system to provide the user with up-to-date information about the status, location, and usage of their contributed samples or data, or related/tracked derivatives and/or IP and/or publications etc. The process works by sending queries or API requests to the asset tracking system and receiving the relevant information in response. Alternatives to this step could include using blockchain-based asset tracking solutions or integrating with existing laboratory information management systems (LIMS) and other asset tracking and data management software solutions (e.g., Asset Panda, BIOS, OpenSpecimen, REDCap, etc.) to streamline the data exchange process.

Finally, the process concludes with the "Make Data Available to UID Holder 318" step, which involves presenting the retrieved data to the user in a secure and user-friendly manner. This step ensures that the user can access and view the information associated with their own de-identified UID, including their consent preferences, biosample status, and research participation history. The process works by rendering the data in a web-based interface or mobile application, using secure communication protocols and access controls to protect the user's information. This is also where the process/system described herein represent the specimens, protocols and other entities as tokens and create a model account system that mimics the underlying asset and allows the patient to hold the token representing the asset in their biowallet, which in that case may represent a custodial or non-custodial blockchain wallet. Alternatives to this step could include providing the data through a secure API or allowing users to download their data in a standardized format for personal record-keeping or portability purposes. Biowallets may be enabled/backed up by a solid-state asset tracking and storage solutions, e.g., "cold wallets," and other hardware solutions, such as those embedded in physical biospecimen storage units (i.e., freezers etc.).

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments). Any of the above mentioned systems, units, modules, engines, controllers, components, process steps or the like may be and/or comprise hardware and/or software as described herein. For example, the systems, engines, and subcomponents described herein may be and/or comprise computing hardware and/or software as described herein in association with FIGS. 4-7. Furthermore, any of the above mentioned systems, units, modules, engines, controllers, components, interfaces or the like may use and/or comprise an application programming interface (API) for communicating with other systems units, modules, engines, controllers, components, interfaces or the like for obtaining and/or providing data or information.

Figure 4:
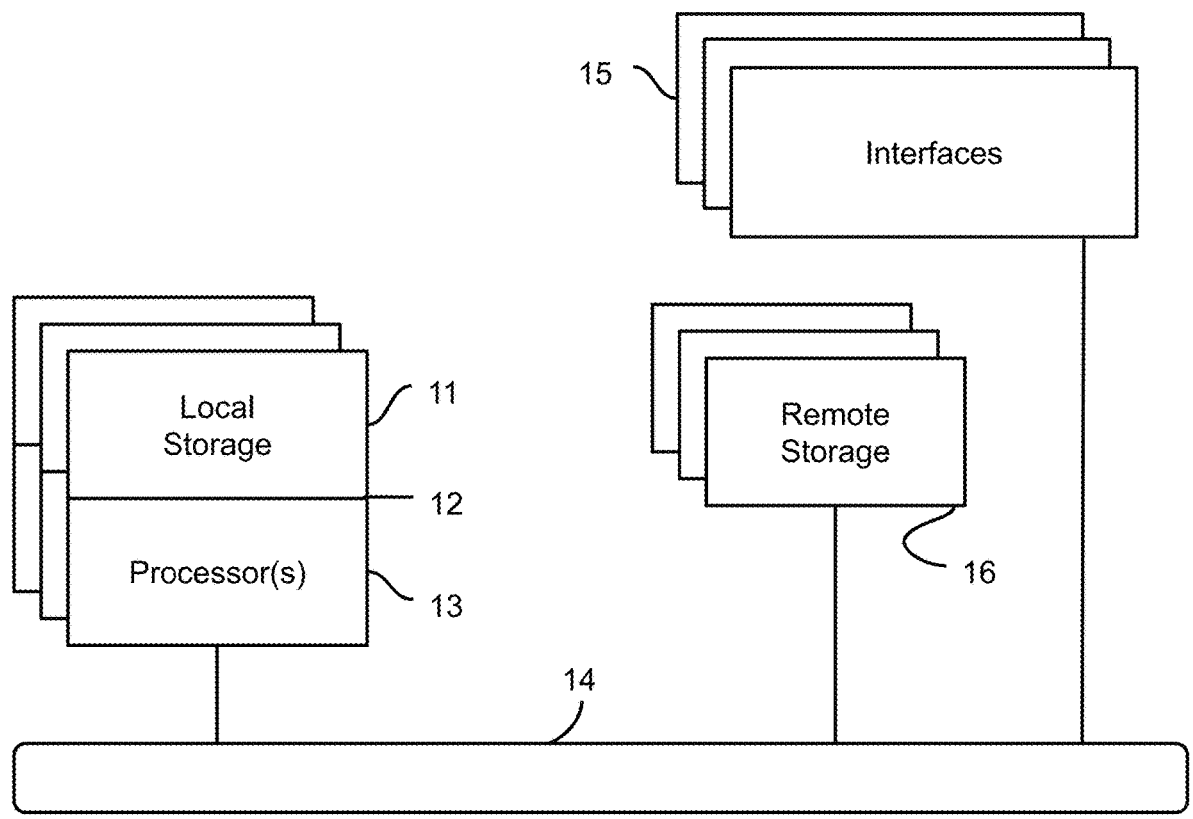
FIG. 4 illustrates one embodiment of the computing architecture that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software-or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
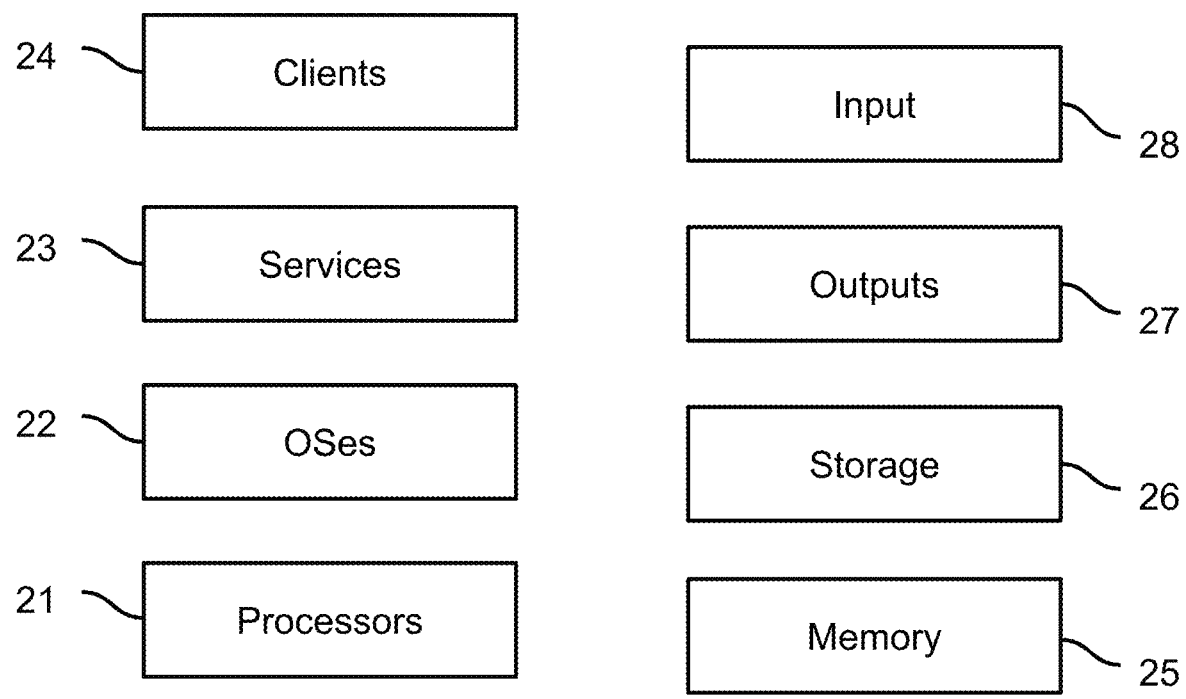
FIG. 5 illustrates components of a system architecture that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
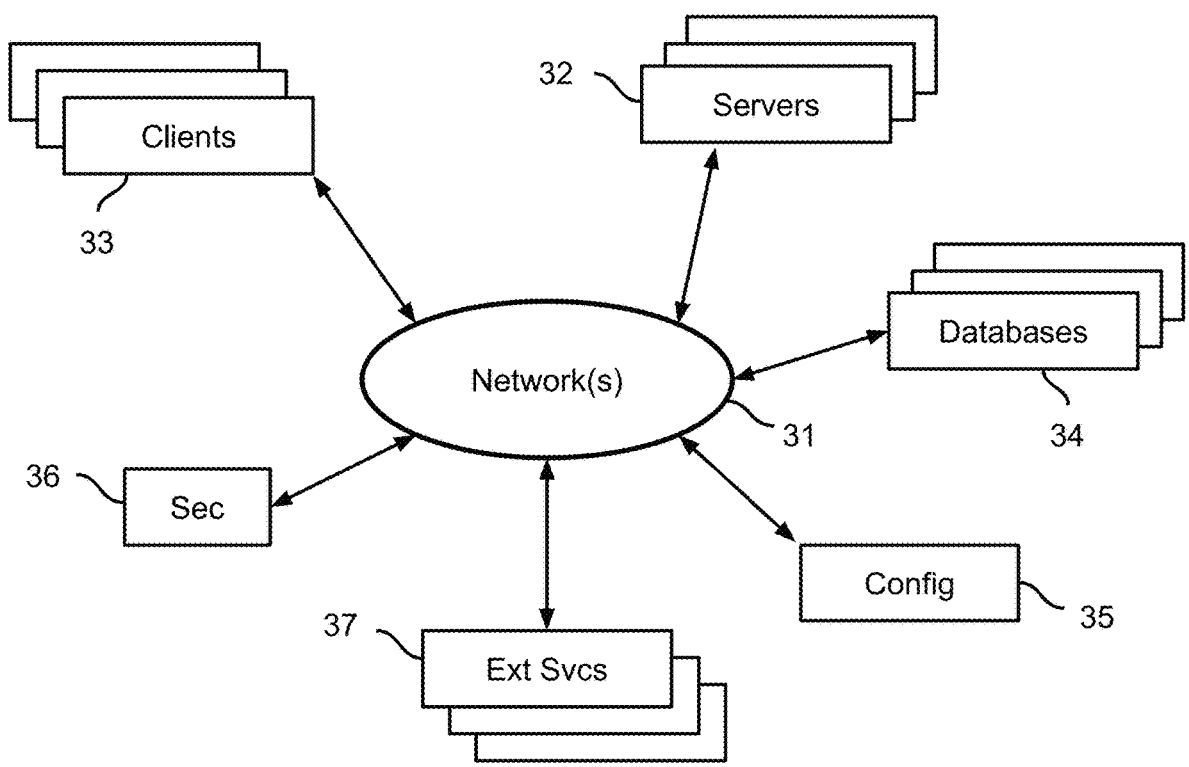
FIG. 6 illustrates components of a computing device that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
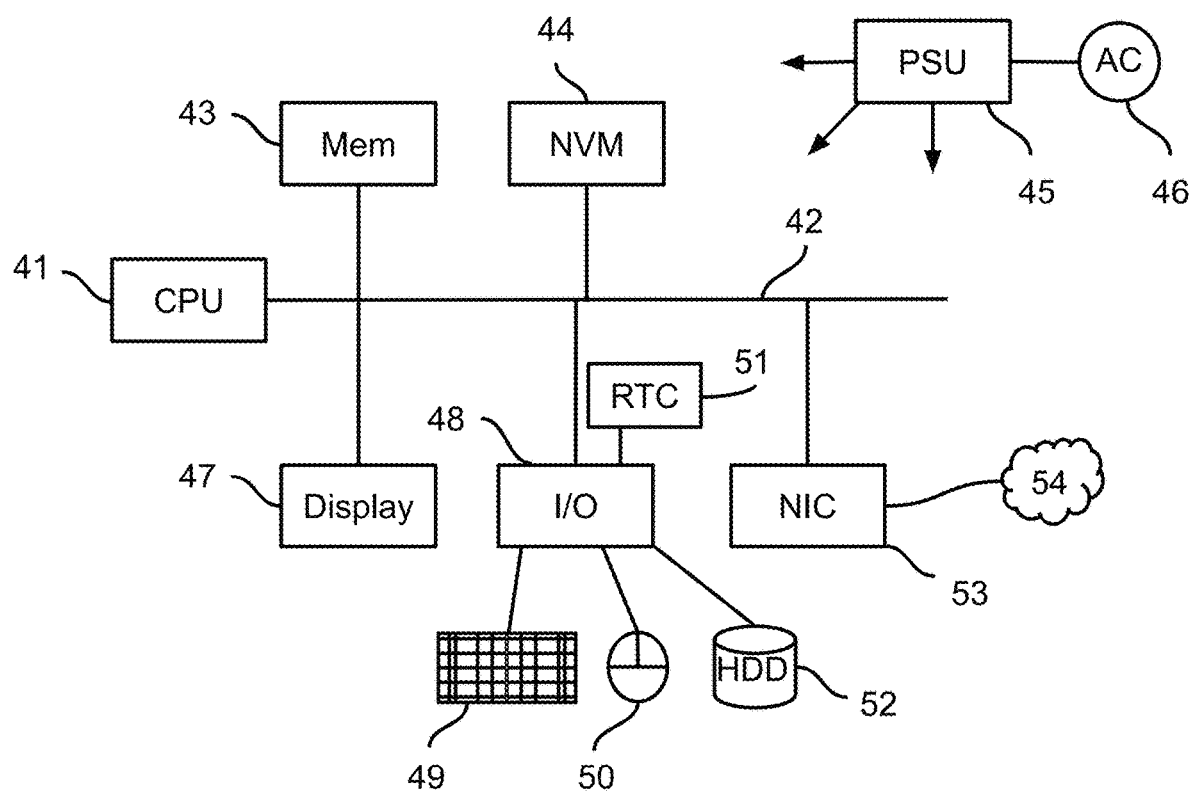
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and/or a process associated with the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer implemented method for connecting users to de-identified data, the computer implemented method comprising:
    obtaining a cryptographically transformed dataset from a consent database, the cryptographically transformed dataset comprising transformed donor consent containing personally identifying information (PII);
    obtaining a de-identified asset code from an identity management database, wherein the asset code is disassociated from the PII;
    cryptographically matching to the de-identified asset code to the cryptographically transformed dataset;
    generating an encrypted linkage between the cryptographically transformed dataset and the de-identified asset code based on the cryptographic matching process;
    electronically storing the encrypted linkage within a secure tracking database;
    maintaining a tracking database of the encrypted linkage, wherein maintaining comprises updating the tracking database when a new linkage is identified;
    receiving asset data from at least one asset tracking system, the asset data related to the de-identified asset code, wherein the asset data comprises the usage, status, and/or location of the asset;
    generating in real time an asset status and relationship by matching asset data and the de-identified asset code; and
    providing the asset status and relationship to a user.

2. The computer implemented method according to claim 1, wherein the consent database comprises a distributed ledger.

3. The computer implemented method according to claim 1, further comprising receiving a consent request from a user;
    receiving authentication information from a user;
    generating a cryptographically transformed dataset;
    storing the cryptographically transformed dataset in a consent database.

4. The computer implemented method according to claim 3, wherein generating a cryptographically transformed dataset comprises using cryptographic hash function, a random number generator, tokenization, pseudonymization, and/or leveraging external identity management systems.

5. The computer implemented method according to claim 4, wherein tokenization comprises Centralized Tokenization via random hex generation and/or JSON Web Token (JWT).

6. The computer implemented method according to claim 1, further comprising generating a researcher relationship between asset donation users and asset research users by mapping relationships between historically generated asset statuses and relationships.

7. The computer implemented method according to claim 1, wherein the PII comprises a set of user preferences, a user email, consent preferences, user metadata, and/or data sharing preferences.

8. The computer implemented method according to claim 7, further comprising automatically allowing or restricting access to the asset based on the consent preferences.

9. The computer implemented method according to claim 1, wherein the cryptographic matching process comprises fuzzy matching algorithms and/or machine learning techniques.

10. The computer implemented method according to claim 1, wherein generating an identified relationship comprises using secure multi-party computation, zero knowledge proofs, and/or homomorphic encryption techniques.

11. The computer implemented method according to claim 1, further comprising generating a consent ledger accessible to the asset tracking system, wherein the consent ledger comprises user permissions to participate in other studies.

12. The computer implemented method according to claim 1, wherein receiving heterogenous datasets from at least one asset tracking system comprises sending an Application Programming Interface (API) request to the asset tracking system, using blockchain-based asset tracking solutions and/or integrating with existing laboratory information management systems.

13. The computer implemented method according to claim 1, wherein providing the asset status and relationship to a user further comprises receiving a search request from a second user, the search request comprising sample type, disease condition, demographic information, and/or consent status; and the second user comprising a researcher.

14. The computer implemented method according to claim 1, wherein providing the asset status and relationship to a user further comprises displaying information associated with the user's cryptographically transformed dataset, consent preferences, biosample status, and/or research participation history.

15. The computer implemented method according to claim 1, wherein the de-identified asset code comprises a de-identified biospecimen code.

16. The computer implemented method according to claim 1, wherein the tracking database and the consent database are stored on separate, secure servers.

17. The computer implemented method according to claim 1, wherein no personally identifiable information is stored or directly accessible within the tracking database.

18. The computer implemented method according to claim 1, wherein the tracking database is configured to automatically receive and standardize heterogeneous data updates from external databases to dynamically update asset tracking information in real-time.

19. A computing system for connecting users to de-identified data, the computing system comprising:
    at least one computing processor; and
    memory comprising instructions that, when executed by the at least one computing processor, enable the computing system to:
        obtaining a cryptographically transformed dataset from a consent database, the cryptographically transformed dataset comprising transformed donor consent containing personally identifying information (PII);
        obtaining a de-identified asset code from an identity management database, wherein the asset code is disassociated from the PII;
        cryptographically matching to the de-identified asset code to the cryptographically transformed dataset;

generating an encrypted linkage between the cryptographically transformed dataset and the de-identified asset code based on the cryptographic matching process;

electronically storing the encrypted linkage within a secure tracking database;

maintaining a tracking database of the encrypted linkage, wherein maintaining comprises updating the tracking database when a new linkage is identified;

receiving asset data from at least one asset tracking system, the asset data related to the de-identified asset code, wherein the asset data comprises the usage, status, and/or location of the asset;

generating in real time an asset status and relationship by matching asset data and the de-identified asset code; and providing the asset status and relationship to a user.

20. A non-transitory computer readable medium comprising instructions that when executed by a processor enable the processor to:

obtaining a cryptographically transformed dataset from a consent database, the cryptographically transformed dataset comprising transformed donor consent containing personally identifying information (PII);

obtaining a de-identified asset code from an identity management database, wherein the asset code is disassociated from the PII;

cryptographically matching to the de-identified asset code to the cryptographically transformed dataset;

generating an encrypted linkage between the cryptographically transformed dataset and the de-identified asset code based on the cryptographic matching process;

electronically storing the encrypted linkage within a secure tracking database;

maintaining a tracking database of the encrypted linkage, wherein maintaining comprises updating the tracking database when a new linkage is identified;

receiving asset data from at least one asset tracking system, the asset data related to the de-identified asset code, wherein the asset data comprises the usage, status, and/or location of the asset;

generating in real time an asset status and relationship by matching asset data and the de-identified asset code; and providing the asset status and relationship to a user.

* * * * *